(12) United States Patent
Finlayson et al.

(10) Patent No.: US 8,611,660 B2
(45) Date of Patent: Dec. 17, 2013

(54) DETECTING ILLUMINATION IN IMAGES

(71) Applicant: Apple Inc., Cupertino, CA (US)

(72) Inventors: Graham D. Finlayson, Norwich (GB);
Mark Samuel Drew, West Vancouver (CA); Clement Fredembach, Servion (CH)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/764,833

(22) Filed: Feb. 12, 2013

(65) Prior Publication Data

US 2013/0170743 A1    Jul. 4, 2013

Related U.S. Application Data

(62) Division of application No. 12/514,079, filed on Dec. 17, 2009, now Pat. No. 8,385,648.

(51) Int. Cl.
*G06K 9/34* (2006.01)
*G06K 9/46* (2006.01)

(52) U.S. Cl.
USPC .......................................... 382/173; 382/191

(58) Field of Classification Search
USPC .................................. 382/173, 191
See application file for complete search history.

(56) References Cited

U.S. PATENT DOCUMENTS

| | | | |
|---|---|---|---|
| 7,046,288 B1 | 5/2006 | Finlayson | |
| 7,084,907 B2 * | 8/2006 | Takeshita | 348/223.1 |
| 7,830,419 B2 * | 11/2010 | Sakurai | 348/223.1 |
| 7,835,002 B2 * | 11/2010 | Muhammed et al. | 356/419 |
| 2003/0016863 A1 | 1/2003 | Risson | |
| 2005/0226496 A1 | 10/2005 | Finlayson | |
| 2006/0110052 A1 | 5/2006 | Finlayson | |

FOREIGN PATENT DOCUMENTS

| | | |
|---|---|---|
| JP | 2004109018 | 4/2004 |
| JP | 2004177679 | 6/2004 |
| JP | 2004242099 | 8/2004 |
| WO | 0001164 A2 | 1/2000 |

OTHER PUBLICATIONS

Yang Wang and Dimitris Samaras, "Estimation of Multiple Illuminants from a Single Image of Arbitrary Known Geometry" ECCV 2002, pp. 272-288.*

"Data for Computer Vision and Computational Colour Science", Computational Vision Lab, School of Computing Science, Simon Fraser University, http://www.cs.sfu.ca/~colour/data/, downloaded Feb. 2, 2012.

Buschbaum, G., (Jul. 1980), 'A Spatial Processor Model for Object Colour Perception,' Journal of the Franklin Institute, Pergamon Press Ltd, 26 pages.

(Continued)

*Primary Examiner* — Utpal Shah
(74) *Attorney, Agent, or Firm* — Wong, Cabello, Lutsch, Rutherford & Brucculeri, LLP

(57) ABSTRACT

An image having m light sources, with m preferably equaling 2 or 3, is segmented into different regions, each of which is lit by only one of the m light sources, by obtaining paired imaged with different filtering, for example a filtered and an unfiltered image, applying to the image pairs sets of m pre-computed mappings at the pixel or region level, and selecting the most appropriate. The rendering of the information in the image maybe adjusted accordingly.

25 Claims, 2 Drawing Sheets

(56) References Cited

OTHER PUBLICATIONS

David A. Forsyth. "A novel algorithm for color constancy," International Journal of Computer Vision, 5:5-36, 1994.
Funt, B., et al., 'Is Machine Colour Constancy Good Enough?', 5th European Conf. on Computer Vision, pp. 455-459, Springer, Jun. 1998.
G.D. Finlayson, et al. 'Shades of gray and colour constancy,' in IS&T and SID's 12th Color Imaging Conference, pp. 37-41, 2004.
G.D. Finlayson, et al. "Color constancy under varying illumination," in Proceedings of the fifth International Conference on Computer Vision, pp. 720-725. IEEE Computer Society, Jun. 1995.
G.D. Finlayson, et al. "Gamut constrained illuminant estimation," Proceedings of the 9th International Conference on Computer Vision, 2, Oct. 2003.
G.D. Finlayson. "Color in perspective," IEEE transactions on Pattern analysis and Machine Intelligence, pp. 1034-1038, Oct. 1996.
K. Barnard, et al. "A comparison of computational color constancy algorithms; part two: Experiments with image data," IEEE Transactions on Image Processing, 11(9):985-996, 2002.
L.T. Maloney, et al. 'Color constancy: a method for recovering surface spectral reflectance,' J. Opt. Soc. Am. A, 3:29-33, 1986.
Land, E., (1977) The Retinex Theory of Color Vision, Scientific American, vol. 237, No. 6, pp. 1-18.
Maloney, "Surface Colour Perception and Environmental Constraints", Colour Perception: Mind and the Physical World, Didier Heyer, Oxford Univ. Press, pp. 279-299, 2003.
P.M. Hubel, et al. "Matrix calculations for digital photography," In IS&T and SID's 5th Color Imaging Conference, pp. 105-111, 1997.
Communication Pursuant to Article 94(3) EPC mailed Dec. 29, 2011, Application No. 06 726 616.3, 4 pages.
Schiele, B., et al., 'Gaze Tracking Based on Face-Color', International Workshop on Automatic Face- and Gesture-Recognition, Jun. 1995.
V. Cardei, et al. "Learning color constancy," In 4th IS&T and SID Color Imaging Conference, 1996.
Barnard et al., (2002) A Comparison of Computational Color Constancy AlgorithmsPart I: Methodology and Experiments With Synthesized Data, IEEE Transactions on Image Processing, vol. 11, No. 9, pp. 972-983.
Barnard et al., (2002) A Data Set for Color Research, Color Research and Application, vol. 27, No. 3, pp. 147-151.
Cheng Lu et al: 'Shadow Removal via Flash/Noflash Illumination;' 2006 IEEE 8th Workshop on IEEE.
Comaniciu, Dorin, (2002) "Mean Shift: A Robust Approach Toward Feature Space Analysis," IEEE Transactions on Pattern Analysis and Machine Intelligence, vol. 24, No. 5, pp. 603-619.
D'Zmura et al., (1993) Color constancy. I. Basic theory of two-stage linear recovery of spectral descriptions for lights and surfaces, /. Opt. Soc. Am. A, vol. 10, No. 10, pp. 2148-2165.
Finlayson et al., (1993) Diagonal Transforms Suffice for Color Constancy, Int. Conf. on Computer Vision (ICCV93).
Finlayson et al., (2001) Color by Correlation: A Simple, Unifying Framework for Color Constancy, IEEE Transactions on Pattern Analysis and Machine Intelligence, vol. 23, No. 11, pp. 1209-1221.
Finlayson et al., (2002) Removing Shadows from Images, Eccv 2002: European Conference on Computer Vision, pp. 4:823-836, Lecture Notes in Computer Science vol. 2353.
Finlayson et al., (2005) Human Visual Processing: Beyond 3 Sensors, IEE Int. Conf. On Visual Information Engg. (VIE2005), pp. 1-7.
Finlayson et al., Convex Programming Color Constancy, In: Workshop on Color and Photometric Methods in Computer Vision, IEEE, Oct. 2003, 1-7.
Finlayson G D et al: 'Colour Constancy Using the Chromagenic Constraint' Computer Vision and Pattern Recognition, 2005. CVPR 2005. IEEE Computer Society Conference on San Diego, CA, USA Jun. 20-26, 2005, Piscataway, NJ, USA,IEEE, Jun. 20, 2005, pp. 1079-1086, XP010817463 ISBN: 0-7695-2372-2.
Finlayson G et al: 'Detecting Illumination in Images;' Computer Vision 2007. IEEE 11th International Conference on Oct. 14, 2007.
Finlayson G et al: "4-Sensor Camera Calibration for Image Representation Invariant to Shading, Shadows, Lighting, and Specularities;" Proceedings of the Eight IEEE International Conference on Computer Vision, Jul. 7, 2001.
Fredembach et al., (2005) Hamiltonian path based shadow removal, British Machine Vision Conf.
G.D. Finlayson, P.M. Morovic, and S.D. Hordley. The chromagenic colour camera and illuminant estimation. Proc. of the 13th Color Imaging Conference, pp. 20-25, 2005.
G.D. Finlayson, S.D. Hordley, and P.M. Morovic 'Chromagenic filter design', Proceedings of the 10th AIC, 2005.
Hordley et al., (2006) Reevaluation of color constancy algorithm performance, /. Opt. Soc. Am. A., vol. 23, No. 5, pp. 1008-1020.
Jiang, et al., (2003) Tracking Objects with Shadows, 10 pgs.
Klinker et al., (1990) A Physical Approach to Color Image Understanding, International Journal of Computer Vision, 4,pp. 7-38.
Kodak. Kodak Wratten Filters, Kodak Limited London, Fourth Edition 1969, p. 26.
Lin et al., (1997) Detection of Specularity Using Stereo in Color and Polarization Space, Computer Vision and Image Understanding, vol. 65, No. 2, pp. 336-346.
Marimont et al., (1992) Linear models of surface and illuminant spectra, /. Opt. Soc Am. A., 1905-1913.
McCamy et al., (1976) "A Color-Rendition Chart," Journal of Applied Photographic Engineering, vol. 2, No. 3, pp. 95-99.
Nascimento et al., (2002) Statistics of spatial cone-excitation ratios in natural scenes, /. Opt. Soc. Am. A, vol. 19, No. 8, pp. 1484-1490.
Parkkinen et al., (1989) Characteristic spectra of Munsell colors, /. Opt. Soc. Am. A, 6:318-322.
Rubin et al., (1982) Color Vision and Image Intensities: When are Changes Material?, Biol. Cybern., 45:215-226.
Salvador E et al: 'Cast shadow segmentation using invariant color features;' Computer Vision and Image Understanding, Academic Press, San Diego, CA, vol. 95, No. 2, Aug. 2004.
Strang, G. 'Linear Algebra and its Applications', Harcourt, Brace and Jovanovich, 4th Edition, pp. 146-148.
Swain, M., et al., 'Color Indexing', International Journal of Computer Vision, 7(1):11-32 (1991).
Tappen et al., (2003) Recovering Intrinsic Images from a Single Image, Advances in Neural Information Processing Systems 15, MIT Press.
Tsukada et al., (1990) An Approach to Color Constancy Using Multiple Images, Int. Conf. on Computer Vision (ICCV90), pp. 385-389.

\* cited by examiner

DETECTING ILLUMINATION IN IMAGES

BACKGROUND

Much of computer vision, image processing and imaging in general is predicated on the assumption that there is a single prevailing illuminant lighting a scene. However, often there are multiple lights. Common examples include outdoor scenes with cast and attached shadows, indoor office environments which are typically lit by skylight and artificial illumination and the spot-lighting used in commercial premises and galleries. Relative to these mixed lighting conditions, many imaging algorithms (based on the single light assumption) can fail. Examples of failure include the inability to track objects as they cross a shadow boundary or tracking a shadow rather than the object, an incorrect colour balance being chosen in image reproduction (e.g., when printing' photographs) and in an incorrect rendering of the information captured in a scene. The last problem is particularly acute when images containing strong shadows are reproduced. Operating under the single light assumption, the imaging practitioner can chose either to make the image brighter (seeing into the shadows) at the cost of compressing the detail in the lighter image areas or conversely keeping the bright areas intact but not bring out the shadow detail. Indeed, many photographs are a poor facsimile of the scenes we remember because our own visual system treats shadow and highlight regions in a spatially adaptive way in order to arrive at quite a different perceptual image.

There is a good deal of work in the literature for identifying illumination change in images. Most of the previous approaches work by comparing pixels (or regions) that are spatially adjacent. Rubins and Richards [1] argue that the RGBs across a shadow edge have a certain well defined relationship. When this relationship does not hold then the edge is not a shadow edge. Freeman et al. [2] learn the statistics of reflectance and illumination edges and have some success at classifying edges in images. Finlayson et al. in [3] show how a single grey scale image can be formed from a colour image where there are no edges due to liumination. Comparing edges in this image with those in the colour image is used as a means for shadow edge detection. Moreover, in [4] Freclembach and Finlayson consider how local edges can be integrated to identify coherent shadow regions. Re-integration of edges, with edges on shadow boundaries bridged across the boundary, results in a colour without shadows, to a good degree. In these methods, shadow edges are key. While this method can work well, it is far from perfect, and moreover is tailored to the shadow detection, as opposed to the illumination detection problem. Further, a region-based rather than edge-based method would provide more evidence indicating shadows.

Various embodiments described herein seek to provide a method for segmenting illumination in images.

SUMMARY

According to a first embodiment, there is provided a method for processing an image having a plurality of m light sources by segmenting the image into different regions, each of which is lit by only one of the m light sources. One such method may include obtaining paired images with different sets of spectral components, and applying sets of m pre-computed mappings at the pixel or region level to the image pairs. The images may be paired images with different filtering, e.g. filtered and unfiltered images.

Various embodiments are based on the realisation that the relationship between image colours (e.g., RGBs) and corresponding image colours captured through a coloured filter depends on illumination. The methods described herein determine the number of distinct relations present in an image and filtered image pair and, by assigning a relation to each pixel or region, identify which parts of the image correspond to different colours of light. The method works: for an RGB camera and R, G or B filtered counterparts; for an RGB camera and a second set of one or more sensor responses (e.g. C, M and/or Y); for any camera that takes a primary multi-spectral image (with two or more sensors) and a secondary multispectral image (with one or more sensors); given a camera with N spectral sensitivities capturing a primary image and examining the relationship between the image and a second image which has m sensor measurements. For example, if we take an n sensor camera, the first m measurements can be related to the remaining n-m sensors, and so the relation could be an (n−m)×m matrix. For n=6 and m=3 we have a 3×3 matrix relation.

Relationships can be computed based on the image data or can be pre-computed during a training stage. Relations can be assigned to pixels or regions (and so regions or pixels identified as particular illuminants) using a robust statistical optimisation procedure or using a simple search procedure. The search procedure may involve two stages. First, a set of m relations may be chosen from the larger set of N all possible relations. Second, the appropriateness of a chosen M set is determined for the primary and secondary image pair. The m-set that is the most appropriate overall determines which pixels or regions are lit by which lights.

The appropriateness of a given relation may be determined by how well it predicts a particular secondary image response vector given a corresponding primary response vector. If relations are linear transforms, the responses from the primary images can be mapped by one of the m relations in the m-set and the one which generated a new set of outputs which are closest to the secondary image outputs may be deemed most appropriate. In general a relation is the most appropriate if it is more likely (when tested against the other m-1 candidates) in some mathematical sense.

Assuming that the primary and secondary images combined have p measurements per pixel, we can calculate this likelihood by means of many methods. These methods generally test the relationship between the first (q−p) responses to the last p responses (using linear or non-linear functions and any arbitrary distance measure). Equally, the position of the q vector can be used directly and this includes calculating the proximity to a given plane or by computing a probabilistic or other measure. The information that is needed to measure whether a q vector is consistent with a given light can be pre-calculated or can be calculated based on the statistics of the image itself.

The appropriateness of relations can be calculated for pixels or regions. Statistical analysis can be used to evaluate which is the best relation to apply to a set of pixels. The relation that best models a set of pixels could be the relationship which was found to be appropriate the most often.

Alternatively, the appropriateness of a set of relations may be calculated across an image. The difference between the actual secondary response and that predicted by the relation may be summed up across the image. This can give a score for the goodness of a particular relation m-set. The m-set of relations that best accounts for the image data can be found by search.

Images of scenes with cast shadows have two illuminants—direct light and sky and sky only (i.e., for the shadowed regions). According to some embodiments, the shadow and non-shadow areas may be found by testing the appropriateness of all pairs of relations in turn.

Indoor scenes with overhead illumination and light from the window, which may be direct and shadowed, allow for three possible lights. In accordance with one embodiment, regions may be classified to one of three lights by testing the appropriateness of all triples of relations in turn.

According to a second embodiment, there is provided a method for processing an image having a plurality m of light sources by segmenting the image into different regions, each of which 1s lit by only one of the m light sources. The method includes obtaining paired images with different sets of spectral components, finding a best mapping between the images and assigning the majority of pixels best transformed under the mapping found to a first label and others to a second label.

According to a third embodiment, there is provided a method for processing an image having a plurality of m light sources by segmenting the image into different regions, each of which is lit by only one of the m light sources. The method can include obtaining paired images with different sets of spectral components, undertaking a chromogenic pre-processing step for a plurality N illuminants (where N>m) to produce N relations $\Re$ determining for each pixel or region which of the m relations of an m-element subset R that best maps the two images. The images may have different filtering, for example filtered and unfiltered images.

According to a fourth embodiment, there is provided a method of improving the accuracy of information in an image employing the steps of a method according to any of the first, second and third embodiments, and accordingly adjusting the rendering of the information in the image.

According to a fifth embodiment, there is provided an image treatment system that includes a means for detecting illumination in an image and a means for implementing the steps according to any of the first, second, third or fourth embodiments to adjust the treatment of the images.

The approaches presented herein relate to methods for identifying illumination in images. In particular, given an input region with m different lights present, a method is disclosed for segmenting the image into different regions were each region is lit by only one of the m lights. The method can include the chromogenic camera discussed in [5, 6, 7]. An illustrative chromogenic camera takes two pictures of a scene: the first is a conventional RGB image but the second is taken with the same camera using a coloured filter placed in front of the camera optical system. The chromogenic idea can also extend to other camera architectures (see [5, 8] for a discussion); e.g, a camera that has more than 3 sensors can be considered chromogenic in terms of the general theory. In previous work two results were shown. First, that the relationship between RGBs and filtered RGBs depends on the illumination: different lights lead to different relationships. Second, that using (pre-computed) relations alone it was possible to estimate the light colour present in the scene. Moreover, the chromogenic approach was shown to provide a more accurate estimate of the illuminant colour than other methods [7]. While the chromogenic approach worked well on average for the single-prevailing-light illuminant estimation problem, it is in itself not directly applicable for multiple light detection. Indeed, the performance of the chromogenic algorithm for illuminant estimation diminished if only a small proportion of the input pixels were used. Therefore, if many of the input pixels are illuminated by other lights, chromogenic illumination estimation will decrease in accuracy.

In this work we assume only that we have pre-computed for a particular camera a set R of N relations that might plausibly map RGBs to filtered counterparts, for N different lights. If there are in fact m lights in an image newly presented, then use techniques as described herein we can find the set of m relations which best predicts our data. Here, each pixel, or region, is associated with the relation (one of them) that best maps the pixel, or region, to the filtered counterparts. These m relations may be found by using the N pre-computed relations established for the camera. Once found, the pixels, or regions, associated with the same relation are assumed to be illuminated under the same light. Of course, if we find that only a subset of the m relations are used, we may conclude that there are fewer lights than originally hypothesised. This is an important point as, pragmatically, an algorithm performing reasonably can only assume that there will be m lights in any given scene. If, when there are indeed fewer than m lights, the algorithm reports that this is so. For example, in many circumstances it will suffice to assume that there are two or fewer lights. We seek a method which detects two lights when two lights are present but that detects a single illuminant when the scene is lit by a single light.

BRIEF DESCRIPTION OF THE DRAWING

FIG. 3b shows the result of a region-based illuminant detection procedure using the information represented in FIG. 2b and FIG. 3a.

DETAILED DESCRIPTION

Figure 1:
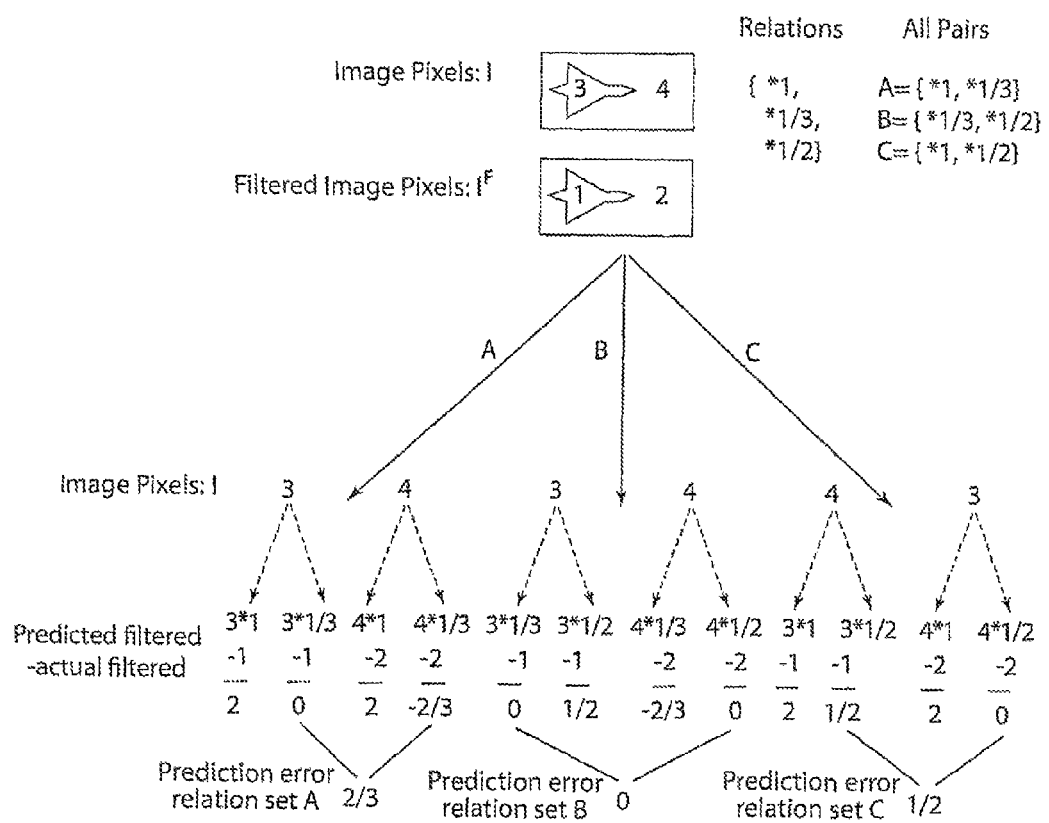
FIG. 1 illustrates a method in, accordance with a preferred embodiment.

We illustrate a method in accordance with one embodiment schematically in FIG. 1. Pre-calculated mappings (here represented by scalar multiplication factors 1, ⅓, and ½) are applied to unfiltered pixel values {3, 4} to best match filtered counterparts {1, 2}. Here we have a very simple image with two regions which for the purposes of this example are represented by single numbers (perhaps this image is the cast shadow of an aeroplane flying over the ground). The top image I, has the region labeled '3' representing a shadow. In this diagrammatic representation, we do not illustrate the algorithm using colour, which the method actually uses in practice. Instead, we simplify to a single, scalar value at each pixel for illustrative purposes. In FIG. 1, the labels '1', '2', '3', '4', are the labels for each region and are also the pixel values: e.g., in the shadow region of image I, the scalar value of the image pixels is the number 3. A corresponding filtered image again with 2 regions is shown having regions '1' and '2' and is denoted as $I^F$.

For these scalar-values images, our pre-computed set sx of mappings from unfiltered to filtered pixel values are simply a set of N scalars, one for each of N lights. Now suppose in this example we have predetermined a set of N=3 mappings for 3 lights, and the mappings from unfiltered to filtered camera responses are given by the three scalars {1, ⅓, ½}. On the right-hand side of FIG. 1, the three possible mappings are shown: the first mapping is designated by '*1', where *1 means we can multiply the image pixel by 1 to predict the corresponding filtered output, and so on. As there are three scaling factors (in the general case these are mappings) there are '3 choose 2'=N!/((N−2)!2!)=3!/(1!2!)=3 possible combinations of two maps. In the diagram we label these map sets A, B and C. We now apply each of these mapping sets in turn. E.g., if we test set A, consisting of the candidate mappings *1 and *⅓, then we apply *1 to the whole image I and then compare errors from the actually observed filtered responses $I^F$, and then also apply *⅓ to the whole image I and compare errors from $I^F$. At the pixel level, for this mapping A, which of the two mappings, *1 or *⅓, results in the least error at a pixel results in that pixel being labeled as associated with the first, or the second, mapping. (Associations of whole regions are described below.)

We carry on as above with the alternate mappings B, meaning the scalar multiplier set {*⅓, *½}, and C, meaning the scalar multiplier set {*1, *½}. Now we determine a method for deciding which mapping is the best, overall. If we follow the line labeled A we see the calculations involved in estimating the goodness of this map set. For the input pixel 3 in image 1, from mappings set A we can apply a map of either *1 or *⅓. Applying each map in turn we arrive at the two leftmost leaf nodes in FIG. 1: we calculate the predicted filtered response we apply the map to the pixel value) calculate error from the actually observed filtered image $I^F$ by subtracting that actual pixel response. In terms of the example we calculate: (3*1−1) and (3*⅓−1) (equaling errors of 2 and 0 respectively for the error for pixels in region '3' mapped to region '1'). Since 0 is less than 2, the mapping *⅓ may be chosen as associated with this pixel. Looking at the next leftmost pair of tree nodes, we go through the same procedure for the second pixel '4'. Again in this case we see that *⅓ better predicts the actual filtered outputs (though, not exactly). Based on relation set A alone we could conclude that both pixels '3' and '4' are best mapped to the corresponding filtered counterparts using the same relation, *⅓, and so at this stage we would conclude that both pixels were captured under the same light. If relation set A best modeled our data overall, then our hypothesis that there were two lights would be wrong (only one relation and hence one light was found to be present).

Parsing the rest of the tree, we can see that the middle relation branch (relation set B) results in the smallest total of absolute difference between predicted and actual responses. (In this simple example the difference is actually exactly 0). Moreover, we can see that pixels '3' and '4' are mapped with two different relations, *⅓ and *½ respectively. So, in this case we would conclude that each pixel is captured with respect to a different illuminant.

Of course, in an actual image processing task an image will have k pixels or regions. Each pixel may typically be described by an RGB triplet, as may the corresponding filtered counterpart. The relations that predict how camera responses are mapped to filtered counterparts are multidimensional, not scalar, functions. For example the relations could be 3×3 matrix transforms or more complex non-linear maps. Moreover, in practice there are many more maps (N=50 to 100 are used in our experiments) than in FIG. 1 and so there can be many more map sets to consider. But, in essence the computation is the same as outline above for FIG. 1. For every pixel, or region, in the image we find the map (belonging to a set of 2 maps if we are considering m=2) that best maps the RGB(s) to the filtered counterpart(s). We can then calculate a prediction error for the whole image. This process can be repeated for all possible map sets. The map set that best predicts filtered counterparts from image RGBs can then be used to directly partition the image into regions lit by different lights. In accordance with this disclosure pixels, or regions, assigned the same map will be assumed to be illuminated by the same light.

If we do not happen to have available any pre-computed mappings from unfiltered to filtered responses, the chromogenic idea can still be used to obtain a best mapping between the two images and assigning the majority of pixels best transformed under the mapping found to one label, and all others to a second label. For example, a 'robust' statistical procedure can find the best mapping from one image to the other, provided that at least half the image (half-plus-1 pixel) is approximately associated with that mapping. Pixels not associated correctly are 'outliers' and belong to the second label. In fact, robust mapping can proceed in a hierarchical manner, going on to find the best mapping in just the second-label region, and going on to descend further until there is no good labeling for individual pixels. Region-labeling may then be brought into play (see below).

There is a subtlety in our approach: we use chromogenic theory only to find regions lit by different lights but do not estimate the colour of the lights themselves. This might appear a little strange. After all, each pixel, or region, is associated with a single relation and each relation is defined (in a training stage) to be the map that takes RGBs to filtered counterparts for a particular light. We might (wrongly) conclude that once we have identified which regions are lit by the same light that we also know the colour of the light for these regions. We do not know the light colours because chromogenic illuminant estimation tends to work best when there is a large colour diversity in a scene. Often the total number of pixels found to be (say) in a shadow is a relatively small proportion of the total number of pixels in the image. In this case the best relation mapping RGBs to filtered counterparts might be for the wrong illuminant. This poses a problem if our goal was to estimate the colour of the light. But, here we seek to use the relations only as a means for discriminating between illuminants.

Chromogenic theory will now be discussed. Let us denote light, reflectance and sensor as E(λ), S(λ) and Qk(λ) where k indexes R, G, and B. For Lambertian surfaces, image formation can be written as:

$$q_k = \int Q_k(\lambda)E(\lambda)S(\lambda)d\lambda \quad (1)$$

where the integral may be evaluated over a the visible spectrum. It is useful to combine the triplet of sensor responses $q_k$ into a single vector, which we denote by $\underline{q}$ (underscoring denotes a vector quantity).

Now, let us introduce linear models for light and surface:

$$E(\lambda) \cong \sum_{i=1}^{D_f} \varepsilon E_i(\lambda) \quad (2)$$

$$S(\lambda) \cong \sum_{j=1}^{D_g} \sigma_j S_j(\lambda)$$

where $E_i(\lambda)$, i=1 ... $D_E$ form an approximate basis set for illuminants, $E_j(\lambda)$, j=1 ... $D_S$ form an approximate basis set for surfaces, and weights $\epsilon_i$ and $\sigma_j$ form the best fit for particular lights and surfaces to these basis sets. The image formation equations (Eq. (1)) can be succinctly written as:

$$\underline{q} = \Lambda(\underline{\epsilon})\underline{\sigma} \quad (3)$$

where $\Lambda(\underline{\epsilon})$ is a 3×N matrix mapping reflectance weights to RGB responses. The kjth term of this Lighting Matrix may be given by:

$$\Lambda(\underline{\varepsilon})_{kj} = \int_\omega Q_k(\lambda) \left[ \sum_{i=1}^{D_\varepsilon} \varepsilon_i E_i(\lambda) \right] S_j(\lambda) d\lambda. \quad (4)$$

One formulation of the colour constancy problem is as follows: Given a set of measured response vectors q, how can we recover the reflectance and illumination characteristics, i.e. recover $\underline{\sigma}$ and $\underline{\varepsilon}$?

The linear model basis sets for light and reflectance, used in (2), are generally determined using Principal Component Analysis [9] or Characteristic Vector Analysis [10] in which case the model dimensions $D_E$ and $D_S$ are found to be 3 (for daylights) and 6 to 8 for reflectances. Given that there are only 3 measurements at each pixel, these large dimensions in the model cast doubt on the solubility of colour constancy. However, looking at (3) we can see that image formation is in reality predicated on a (light dependent) Lighting Matrix multiplying a reflectance weight vector. While we have no knowledge of as $E(\lambda)$ or $S(\lambda)$, we do see that the linearity of (1) is preserved: if we add two lights together we add the respective lighting matrices. It follows that the dimensionality of light and surface, viewed from the perspective of image formation, depends on how well a set of M, 3×N Lighting matrices interacting with N×1 weight vectors model observed image RGBs. By reasoning in this way, Marimont and Wandell [111] dedemonstrated that a very good model of image formation is possible with only $D_E=3$ (three lighting matrices) and $D_S=3$ (three degrees of freedom in reflectance).

This is encouraging because the model numbers are small. However, they are still generally not small enough to enable us to decouple light and reflectance. To see why, suppose we have a single illuminant and s reflectances, providing us with 3s measurements and 3s+3 unknowns. Even by observing that there is a scalar indeterminacy between surface lightness and illuminant brightness (since they multiply each other), so that the unknowns number 3s+2, this is still less than the number of known quantities: I.e., 3s<3s+2, Suppose now, however, that we observe the s surfaces under two lights. We now have 6s measurements and more knowns than unknowns, 6s>3s+5 for two or more surfaces (i.e., 5=6−1=two lights multiplied by 3, minus the brightness indeterminacy). Indeed, a number of authors [12, 13, 14] have presented algorithms which can algebraically solve the colour constancy problem in this case. Implicit to these approaches is the idea that RGBs are mapped across illumination by a 3×3 linear map:

$$\underline{q}_2 = \Lambda(\underline{\varepsilon}_2)[\Lambda(\underline{\varepsilon}_1)]^{-1} \underline{q}_1 \quad (5)$$

Finlayson [14] observed that because we can always generate the same RGBs (through a judicious choice of sigma weights) under any light, we can only hope to solve the two-light constancy problem if the 3×3 linear transform is unique. Indeed, for most sensors, lights and surfaces, uniqueness was shown to hold in a simplified approximation model and the two-light constancy problem was thus shown to be soluble. However, one of the flaws in this approach is the requirement of having available images of the same surfaces seen under two lights, an impractical requirement in general.

In chromogenic theory, rather than capturing a scene under two different lights we instead simulate a second light by placing a filter in front of the camera to generate an additional image. We can write the new filtered responses as $$q_k^F = \int_\omega Q_k(\lambda) F(\lambda) E(\lambda) S(\lambda) d\lambda, \quad (6)$$

$$k = R, G, B.$$

Let us define a filtered illuminant as:

$$E^F(\lambda) = E(\lambda) F(\lambda) \quad (7)$$

Then (6) becomes:

$$q_k^F = \int_\omega Q_k(\lambda) E^F(\lambda) S(\lambda) d\lambda, \quad (8)$$

$$k = R, G, B.$$

where the superscript F denotes dependence on a coloured filter. From an equation-counting perspective we now have enough knowns to solve for our unknowns. We simply take two pictures of every scene, one filtered and one not. Importantly, in [7] it was shown, assuming 3 degrees of freedom in light and surface is an accurate enough portrayal of nature, that the transform mapping RGBs to filtered counterparts uniquely defines the illuminant colour. This result led to the chromogenic theory of illuminant estimation.

The algorithm works in 2 stages. In a preprocessing step we can pre-calculate the relations, one each for each of N illuminants, that map RGBs to filtered counterparts. For example, we find a set of N 3×3 matrix transforms. In the operation phase, we take a chromogenic pair of images—two images, one unfiltered and one filtered. The illumination is unknown for the new, testing pair. We can then apply each of the pre-computed relations, and the relation that best maps RGBs to filtered counterparts is used to index and hence estimate the prevailing illuminant colour [7].

A chromogenic method for illuminant estimation is described in the following two-stage approach. Preprocessing: For a database of N lights $E^i(\lambda)$ and s surfaces $S^j(\lambda)$, calculate $T^j \cong Q_i^F Q_i^+$ where $Q_i^+$ and $Q_i^F$ represent the matrices of unfiltered and filtered sensor responses for the s surfaces, under the ith light; superscript '+' denotes pseudo-inverse [15]. This generates a best least-squares transform, but the method is not limited to least-squares (e.g., robust methods could be used), nor is the method limited to linear (i.e., matrix) transforms, Operation: Given P surfaces in a new, test, image we have 3×P measured image RGB matrices Q and $Q^F$, Then the task of finding the best estimate of the scene illuminant $E_{est}(\lambda)$ may be solved by finding the index i in our set of N illuminants that generates the least sum of squared errors:

$$i_{est} = \text{argmin } (err_i), (i=1, 2, \square, N), \text{ with } err_i = \square T^i Q - Q^F \square \quad (9)$$

It is worth remarking that in the simplest approach the transform matrices may be defined by regression (e.g., the Moore-Penrose inverse uses least-squares regression). Therefore, illuminant relations, implemented as 3×3 matrices, may not perfectly transform RGBs to filtered counterparts. This modest imprecision has two consequences which bear on the method in accordance with the discussion below. First, to accurately estimate the best transform we may need a large test set of surfaces (since we wish the relations to apply for all surfaces). Second, if we attempt to estimate the light colour for a small set of surfaces then we might wrongly estimate the illuminant: the best transform for a set of red patches might be different from the best transform for a large set of colours (red, greens, white etc.). Thus, when we run the chromogenic algorithm for an image that has only a small set of surfaces, we will find a relation, according to the algorithm presented above, but this relation may in fact index the wrong light colour.

In one embodiment, for a given chromogenic image pair, i.e., RGBs along with corresponding filtered counterparts, we can determine which pixels, or regions, are illuminated by the same lights. Below we define our approach formally, assuming there can be in lights in an image. In practice $m \leq 2$ will be appropriate for most images and therefore we set $m=2$ when we outline the particular implementation of our algorithm that is discussed next.

Let us begin by assuming that for N lights we carry out the chromogenic preprocessing step and solve for the N relations $\Re$ that best map RGBs to filtered counterparts. Here, however, we do not necessarily assume that the relation is a 3×3 matrix transform but rather, for generality, assume an arbitrary function $f: \Im^3 \to \Im^3$, where $\Im$ is the set of possible integers in a colour image (for example, for 16-bit colour channels, $\Im$ is the set $[0 \ldots 65, 535]$). Suppose we now select an m-element subset $R \subset \Re$. Taking each pixel, or region, in turn we determine which of the relations best maps the RGB (s) to their filtered counterpart(s). Once each pixel, or region, is assigned a single relation it is a simple matter to calculate how well the set of in relations R accounts for our data. Of course there are many possible m-element subsets $R \subset \Re$. Mathematically, the set of all m element subsets of $\Re$ is denoted $\Re(m)$ and we call this set the m-set of $\Re$. That $R \in \Re(m)$ which best describes the relation between image and filtered counterpart overall is then found through an optimisation procedure (which is essentially a searching algorithm). This effectively finds the m best mappings, and thus an m-level labeling of pixels. E.g., in the case m=2 this amounts to a binary labeling of pixels. This labeling could arise, for example, from shadowed and un-shadowed regions. Before we can write down this optimisation mathematically, we need to introduce little more notation. Let $\Re = \{f^1, f^2, \ldots, f^N\}$ and let $I_k$ and $I_k^F$ denote the kth pixel or region in the image and its filtered counterpart. The relation can be thought of as a mathematical function or computer algorithm that maps an image to filtered counterparts for a particular illuminant labeled i. Thus, if $f^i$, is appropriate for the image region $I_k$, we would expect:

$$f^i(I_k) \cong I_k^F. \qquad (10)$$

For a given relation set R we have to assign to each pixel, or region, $I_k$ one of them relations $f^i$, $i \in 1, 2, \ldots, N$ depending on which best predicts $I_k^F$. Remembering that $\Re(m)$ denotes the set of all m-element subsets of $\Re$, and letting $i_k \in 1, 2, \ldots, m$ denote which of the m relations best applies at the kth pixel or region, we then must solve the following optimisation, which may be stated in general terms as:

$$R^{min}, i_k \sum_k \Box f^{ik}(I_k) - I_k^F \Box, \qquad (11)$$

with $R \in \Re(m)$ and $i_k \in \{1, 2, \ldots, m\}$.

If $I_k$ is a single pixel then $\Box$, $\Box$ is some simple scalar function, e.g., the sum of absolute values of vector components, or the square root of the sum of absolute values squared. If $I_k$ is a region there is scope to make $\Box$, $\Box$ a more robust measure, eg., the median deviation.

In the final step of the present method, we wish to identify different regions as belonging to different lights. After solving the optimisation (11), we arrive at the best overall m-element set of mappings R and the best set of pixel labels and $i_k$ $k \in 1, 2, \ldots, m$. This can associate regions with labels for m lights directly by the relation indices $i_k$ as follows: all the pixels, or areas of pixels, where $i_k=1$ may be taken as having been imaged under the same light, indexed by '1'. Similarly, all pixels or areas where $i_k=2$ are taken as under another light, index by '2', and so on up to $i_k=m$.

To make our approach slightly more general we allow the goodness of fit operation to be carried out pixel-wise but will assign lighting labels on a region by region basis. Suppose we compute an assignment of n regions indexed by k, $k=1, 2, \ldots, n$ in an image. Many algorithms exist for such a task; such an algorithm is referred to as a segmentation procedure. Let $I_{kj}$ denote the jth pixel in the kth region. We can now, initially, assign the relation labels $i_{kj}$ by minimising the following region-driven statement:

$$R^{min}, i_{kj} \sum_k \Box f^{ikj}(I_{kj}) - I_{kj}^F \Box, \qquad (12)$$

with $R \in \Re(m)$, $R \in \{1, 2, \ldots, m\}$, and $i_{kj} \in (1, 2, \ldots, m)$.

We can now assign labels to entire regions based on the fits to the underlying pixels:

$$i_k = \text{bestlabel}(\{i_{kj}: i_{kj} \in I_k\}) \qquad (13)$$

Here, function bestlabel( ) must choose which label to assign to region k, of all the up to m labels assigned to pixels $I_{kj}$ in region k. An obvious candidate for function bestlabel( ) is the mode function, E.g., if $I_k$ has 100 pixels and, of those 100, 90 have a relation label i, then the mode is also i and the overall label for the region should also be i. Another candidate would be that label minimising the overall error in mapping unfiltered to filtered pixels, in that region k.

We remark that minimising (11) or (12) can be computationally laborious. The computational cost is proportional to the cardinality of the set $\Re(m)$. If, say, there are 50 relations in $\Re$ (a reasonable number to account for the range of typical lights [16]) then the cardinality of the m-set $\Re(m)$ is [50!/ (m!(50-m)!] which for m=2, 3, 4, 5 is equal to 1225, 19600, 230300 and 2118110. A brute force search is only really possible for small m, i.e. m=2 or m=3.

If, of course, we allow all possible maps to be in $\Re$ (e.g. all possible 3×3 matrices) then our solution strategy will follow classical optimisation theory (and not the combinatorial approach suggested above). In the optimisation approach we would start with an initial guess of m good transforms and then seek to update these incrementally by minimising a cost function. For example, we might employ the widely used gradient descent method. These differential optimisations tend to find locally, as opposed to globally, optimal solutions. Heuristic techniques such as simulated annealing might be used to find a global optimum.

To complete this section, we suggest other modifications of the basic algorithm which can be used for illuminant detection. First, though, we have presented the basic theory assuming three RGB sensors and three filtered counterparts, other embodiments cover the case where we have six arbitrary sensor response functions (they need not be a filter correction apart). In this case the relation f( ) best maps the first three sensor responses to the second three. Further we can allow other means of arriving at multidimensional response data. For example our method can detect shadows given a normal RGB image and a second image taken where a flash is used to illuminate the scene. In general, methods in accordance with this disclosure can be applied to any capture condition which might be written as;

$$q_k^F = \int_\omega Q_k(\lambda)E(\lambda)S(\lambda)d\lambda, \quad (14)$$
$$k = 1, 2, \ldots, Q$$

where $Q_k(\lambda)$ might be a sensor response function or a sensor multiplied by a filter transmittance. Setting—

$$Q_k(\lambda) = \frac{E(\lambda) + E^{flash}(\lambda)}{E(\lambda)}$$

accurately models the effect of adding flash light to a scene and is also covered by the present invention.

The number of sensors is also not important in the present embodiments. Indeed, given a q sensor camera, our method will still work if p of the sensor responses, recorded for different lights and surfaces, are related to the remaining q–p responses by some function $f()$. In the embodiment presented in detail above, q=6 and p=3, but equally q and p could be any two numbers where p<q: q=7 and p=2, or q=3 and p=1. The last case draws attention to the fact that for a conventional RGB camera, we can relate the blue responses to the red and green responses in the manner described above. And, even though the relationship is less strong (e.g. the fit in (9) will have significant error), the method will still provide a degree of illumination detection.

Also, the means by which we relate the first p responses to the remaining q–p responses (for a q response camera) can be written in several general forms. In the method described above, where q=6 and p=3, the unfiltered responses are related to filtered responses by a 3×3 matrix transform. More generally, this map could be any function of the form $f: \Re^3 \to \Re^3$ (a function that maps a 3-dimensional input to a 3-dimensional output). For an arbitrary q (number of sensors) and p (number of dependent responses), the mapping function $f: \Re^3 \to \Re^3$.

We also point out that we can generalise how we compute the distances that we have thus far written as $\Box f(I_k^{q-p})-I_k^p\Box$, where $I_{q-p}$ and $I_p$ denote the first q–p and remaining p responses and the subscript k indexes the kth pixel or region). We can do this in two ways. First, we can use an arbitrary definition of the magnitude function $\Box$, $\Box$, e.g., it could be the standard Euclidean distance, or, it could be any reasonable distance function (e.g. such as one of the Minkowski family of norms). Second, we observe that if $f(I_k^{q-p}) \approx I_k^p$, then this implies that the q vector lies in a particular part of q-dimensional space. For example, f( ) is a p×(q–p) matrix transform then the q vector of responses must lie on a q–p dimensional plane embedded in q space. Thus, rather than computing a relation F( ) directly and then calculating $\Box f(I_k^{q-p})-I_k^p\Box$ we could instead calculate the distance of the q vector of responses to a q–p dimensional plane. It follows we might rewrite our fitting function as: $\Box P(I_k)-I_k\Box$ where P projects the q vector onto some q–p dimensional plane. Subtracting the projected vector from the original then makes a suitable distance measure.

We can extend this idea still further and write $\Box P(I_k)-I_k\Box = P^\perp(I_k)\Box$ projects the q vector of responses onto the p dimensional plane orthogonal to the q–p dimensional plane where we expect $I_k$ to lie. More generally, we might calculate he measure $P(I_k)$ where P is a function that returns a small number when the response vector is likely for the illuminant under consideration. Here P could, for example, be some sort of probabilistic measure.

In one embodiment we determine the fit, or likelihood, that a given q-vector of responses occurs for a given light in a preprocessing step. This might be the 3×3 matrices best mapping RGBs to filtered counterparts for a given training set. Alternatively, for the other embodiments discussed we could pre-calculate the best relations of the form $f: \Re^{p-q} \to \Re^p$. Or, if we use the position of the response vectors directly, then we could pre-calculate the best fitting plane or pre-calculate a probabilistic model which ascribes a likelihood that given q vectors occur under different lights. However, we note that that the fit, or likelihood, that a given q-vector of responses occurs for a given light can be computed within a single image by using the image statistics and this is also covered by this disclosure. For example, for the case of 3×3 linear maps taking RGBs to filtered counterparts and where there are lust two lights present in a scene, we might find the pair of transforms that best accounts for the image data (one of the pair is applied at each pixel according to which light is present) by using robust statistics. We find the best 3×3 matrix that maps at least 50% of the image plus one pixel to corresponding filtered counterparts. The remaining pixels can be treated as outliers and can be fit separately. The inliers and outliers can determine which part of the image are lit by the different lights. Our experiments indicate good illuminant detection in this case. Further, all the different combinations of distance measures, and fitting functions described above, could, in principle, be trained on the image data itself, using standard techniques.

To summarise, in methods according to the present disclosure when the position of the q vector of responses measured by a camera depends strongly on illumination and weakly on reflectance we can use the position in q space to measure the likelihood of this response occurring under that light. This likelihood can be calculated in many ways including testing the relationship between the first q–p responses to the last p responses (using linear or non linear functions and any arbitrary distance measure). Equally, the position of the q vector can be used directly and this includes calculating the proximity to a given plane or by a computing a probabilistic or other measure. The information that is needed to measure whether a q vector is consistent with a given light can be pre-calculated or can be calculated based on the statistics of the image itself.

There will now be described a method, working with real images, of finding image regions lit by two illuminants. Arguably, the m=2 case is the most interesting and most common case. Many scenes are lit by a single light or by two lights. Often in the outdoor environment there is a single light. As well, there are often two lights: the sun+sky (non- shadow) and the sky alone (shadow). Similarly, indoors at night we may light the room by a single incandescent bulb. Yet, during the day many office environments are a combination of artificial light from above the desk and natural light coming through the window. Indeed, it is hard to think of normal circumstances when m is much larger than 2.

Figure 2A:
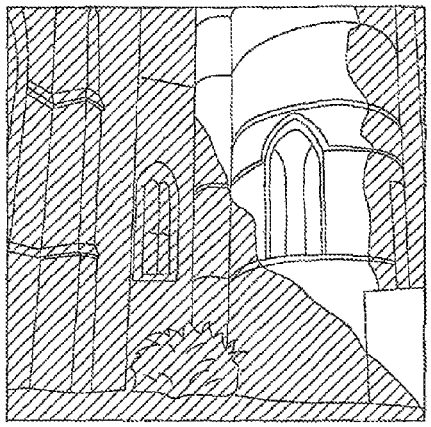
FIGS. 2a and 2b show an original image and its estimated illuminations obtained by a method in accordance with this disclosure.
Figure 2B:
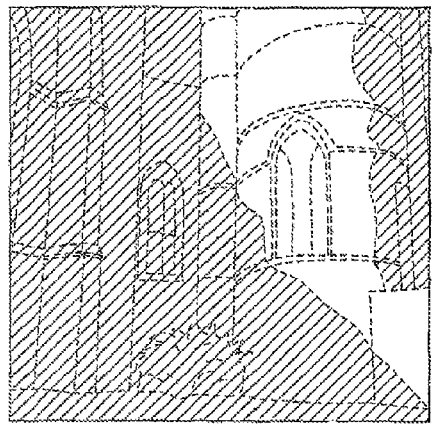

Let us, thus, implement the algorithm given in Eq. (ii) for the m=2 case. We begin by creating the set $\Re$, which in this example consists of fifty 3×3 matrix transforms. These transforms were calculated by imaging a standard colour reference chart (the Macbeth ColorChecker [17]) under 50 lights one at a time, with and without a coloured filter, using a Nikon D70 camera (which outputs linear (raw unprocessed) images). The 50 lights were chosen to be representative of typical lights that are encountered every day and included: blue sky only, blue sky+sun, overcast sky, fluorescent light and incandescent illumination. The Macbeth ColorChecker has 24 different coloured patches and so we solved for each 3×3 transform by regressing the 24 unfiltered RGBs onto the filtered counterparts, Now we run the algorithm. In the first pass, we can start by making use of a pixel-based optimisation algorithm, using Eq. (11): We calculate the 2-set $\Re(2)$: the set of all subsets of $\Re$ with 2 elements. Because there are 50 transforms there are '50 choose 2' equals 1,225 combinations. For a given relation set R containing a particular pair of 3×3 matrices, we test which matrix best maps each image pixel to the filtered counterpart. As we do so, we calculate the discrepancy, or error, between the mapped RGBs and the actual filtered responses. We repeat this process over all 1,225 combinations of two lights (and hence mappings); we determine that one pair of transforms, one of which is applied at each pixel, that best maps the unfiltered to filtered image overall. FIG. 1 illustrates this process where there are just 3 relations (mappings) and instead of matrices the relations are simple scalar multipliers. FIG. 2 shows typical results of an optimisation Eq. (11) applied at the pixel level. FIG. 2($a$) shows the original image; since it has shadows there are clearly two lights present in the scene. It represents noisy, pixel-based detection.

Because a single transform is applied to each pixel, we can view the output of this process as a binary image. Denoting the matrix transform that best fits the data as '0' (for the 1st transform) and '1' (for the second transform), we show our estimate of the illuminations present in the scene in FIG. 2($b$). While it is clear that we have some correspondence between shadowed and non-shadow regions, and therefore our algorithm is working, the output is far from perfect. It looks like the correct answer, but appears corrupted by a high degree of noise.

Figure 3A:
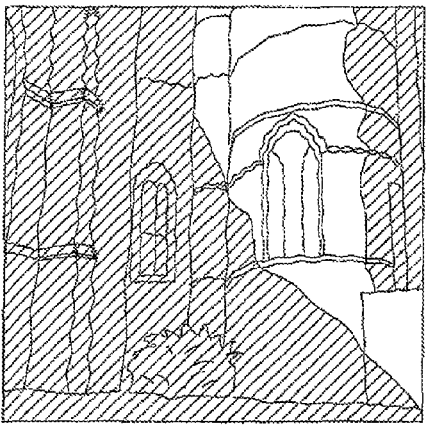
FIG. 3a shows an initial segmentation of an image in accordance with one embodiment.
Figure 3B:
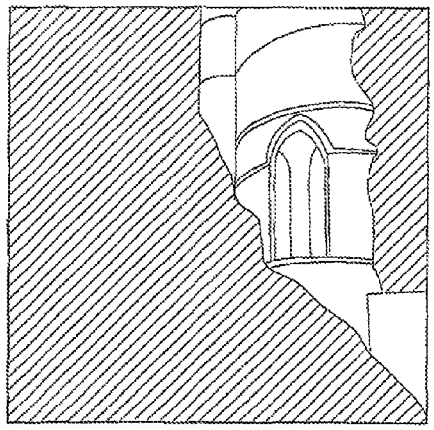

Now let us apply the region-based label assignment given by optimisation Eq. (12) followed by Eq. (13). Using the Mean Shift algorithm [18], or any similarly edge-preserving segmentation algorithm, we can calculate an initial segmentation of an image. FIG. 3($a$) shows the segmentation arrived at by the standard Mean shift algorithm. It will be noted that there are many regions in the image: that is, we have over-segmented the image vis-a-vis our present objective, namely disambiguating shadowed from non-shadowed regions. This is important to note, as we wish to be sure that the segmentation of the input image has not merged regions which are lit by different lights (the degree of segmentation is controllable using parameters that the Mean Shift algorithm uses, and this applies to other edge-preserving segmentation algorithms as well).

FIG. 3($b$) is the result of a region-based illuminant detection procedure. We start with the output given in FIG. 2($b$). In conjunction with the regions obtained using the Mean Shift segmentation in FIG. 3($a$), we then go on to assign output labels as in Eq. (13). In this variant, for each region we count the proportion of '0's and '1s' and assign the majority number to the entire region. The result shown in FIG. 3($b$) makes it clear that we have obtained an excellent segmentation of the lights present in the scene. FIG. 3 represents a dean determination of shadow areas. Importantly, we have found this simple approach to illumination detection reliably delivers good results.

Thus, we have disclosed a method for segmenting illumination in images. The method can use pre-determined transforms of pairs of images from unfiltered to filtered versions, where a chromogenic filter is utilised. To determine a segmentation with m or fewer illuminant labels, sets of m mappings can be applied at the pixel or region level to the image pairs, to best generate an assignment of labels. Alternatively, if no pre-calculated mappings are available, m or fewer assignments of labels can be determined by regression or similar method applied to the image pairs in a hierarchical manner. The region-based approach generates cleaner illumination segmentations, in general.

Where reference is made in this specification to a filtered and an unfiltered image, this includes images with differing filtering characteristics. One can use instead two filtered images with different filtering. Alternatively one can simply use two different cameras, for example cameras of different makes. In a specific example, a conventional digital camera and a camera with a yellow filter are used.

References

[1] J. M. Rubin and W. A. Richards. Color vision and image intensities: When are changes material. Biological Cybernetics, 45:215-226, 1982.

[2] M. F. Tappen, W. T. Freeman, and E. H. Adelson, Recovering intrinsic images from a single image. In Advances in Neural Information Processing Systems 15. MIT Press, 2003.

[3] G. D. Finlayson, S. D. Hordley, and M. S. Drew. Removing shadows from images. In ECCV 2002: European Conference on Computer Vision, pages 4:823-836, 2002. Lecture Notes in Computer Science Vol. 2353.

[4] C. Fredembach and G. D. Finlayson. Hamiltonian path based shadow removal. In British Machine Vision Conf., 2005.

[5] G. D. Finlayson and P. M. Morovic. Human visual processing: Beyond 3 sensors. In IEEE International Conference on Visual Information Engg. (VIE200S), pages 1-7, 2005.

[6] G. D. Finlayson, S. D. Hordley, and P. M Morovic. Chromogenic filter design. In 10th Congress of the Int. Colour Assoc. (AIC2005), 2005.

[7] G. D. Finlayson, S. D. Hordley, and P. M Morovic. Colour constancy using the chromogenic constraint, in Computer Vision and Ratt. Rec. (CVPR2005), 2005.

[8] G. D. Finlayson. Image recording apparatus employing a single CCD chip to record two digital optical images. Awarded U.S. Pat. No. 7,046,288 on May 16, 2006.

[9] J. P. S. Parkkinen, J. Hallikainen, and T. Jaaskelainen. Characteristic spectra of Munsell colors, J. Opt. Soc. Am, A, 6:318-322, 1989.

[10] L T. Maloney and B A Wandeli. Color constancy: a method for recovering surface spectral reflectance. J. Opt. Soc, Am. A, 3:29-33, 1986.

[11] D. H. Marimont and B. A. Wandell. Linear models of surface and illuminant spectra. J. Opt. Soc. Am. A, 9:19054913, 1992.

[12] M. D'Zmura and G. Iverson. Color constancy. L Basic theory of two-stage linear recovery of spectral descriptions for lights and surfaces. J. Opt. Soc. Am. A, 10:2148-2165, 1993.

[13] M. Tsukada and V. Ohta. An approach to color constancy using multiple images. In Int. Conference on Computer Vision (ICCV90}, 1990.

[14] G. D. Finlayson, M. S. Drew, and B. V. Funt. Diagonal transforms suffice for color constancy. In International Conference on Computer Vision (ICCV93), 1993.

[15] G. Strang. Linear Algebra and its Applications. Harcourt, Brace, Jovanovich, 3rd edition, 1988.

[16] K. Barnard, L. Martin, B. V. Funt, and A. Coath. A data set for colour research. Color Research and Application, 27:147451, 2002.

[17] C. S. McCamy, H. Marcus, and J. G. Davidson. A color-rendition chart, J. App. Photog. Eng., 2:95-99, 1976.

[18] D. Comaniciu and P. Meer. Mean shift: A robust approach toward feature space analysis. PAM I, 24:603-619, 2002.

The invention claimed is:

1. A non-transitory program storage device comprising instructions stored thereon to cause one or more processors to:
   obtain a first image of a scene that is illuminated with m light sources, wherein the first image is associated with a first spectral component;
   obtain a second image of the scene, wherein the second image is associated with a second spectral component that is different from the first spectral component;
   obtain mappings between regions in the first image and spatially corresponding regions in the second image;
   apply the mappings to regions of the first image to obtain values for the spatially corresponding regions of the second image, wherein each value is indicative of the likelihood that the value's corresponding region is illuminated by 1 of the m light sources;
   identify that mapping whose associated value is most indicative of one of the m light sources; and
   identify the one light source as an illuminant of the scene.

2. The non-transitory program storage device of claim 1, wherein the instructions to cause the one or more processors to obtain first and second images comprise instructions to cause the one or more processors to capture the first and second images with an imaging device.

3. The non-transitory program storage device of claim 2, wherein the instructions to cause the one or more processors to capture the first and second images comprise instructions to cause the one or more processors to capture the first image with a first sensor and the second image with a second different sensor of the imaging device.

4. The non-transitory program storage device of claim 1, wherein the instructions to cause the one or more processors to obtain first and second images comprise instructions to cause the one or more processors to retrieve first and second images from a storage device.

5. The non-transitory program storage device of claim 1, wherein the first image comprises an RGB image and the second image comprises a filtered RGB image.

6. The non-transitory program storage device of claim 1, wherein the instructions to cause the one or more processors to obtain mappings comprise instructions to cause the one or more processors to obtain N mappings, where N>m.

7. The non-transitory program storage device of claim 6, wherein the instructions to cause the one or more processors to apply the mappings comprise instructions to cause the one or more processors to apply N-choose-m combinations of the N mappings.

8. The non-transitory program storage device of claim 6, wherein the instructions to cause the one or more processors to apply the mappings comprise instructions to cause the one or more processors to segment the first image into different regions, each of which is lit by only one of the m light sources.

9. The non-transitory program storage device of claim 7, wherein the instructions to cause the one or more processors to identify that mapping whose associated value is most indicative of one of the m light sources, comprise instructions to cause the one or more processors to identify that mapping that has the lowest prediction error.

10. The non-transitory program storage device of claim 1, wherein the instructions to cause the one or more processors to identify that mapping whose associated value is most indicative of one of the m light sources comprise instructions to cause the one or more processors to identify that mapping that, based on the first image, most closely predicts the second image.

11. The non-transitory program storage device of claim 1, further comprising instructions to cause the one or more processors to render the first image based, at least in part, on the identification of the m illuminants.

12. The non-transitory program storage device of claim 1, wherein the instructions to cause the one or more processors to obtain mappings comprise instructions to cause the ne or more processors to apply robust statistical procedures to generate the mappings.

13. A method of processing an image, comprising:
   obtaining a first image of a scene that is illuminated with m light sources, wherein the first image is associated with a first spectral component;
   obtaining a second image of the scene, wherein the second image is associated with a second spectral component that is different from the first spectral component;
   obtaining mappings between regions in the first image and spatially corresponding regions in the second image;
   applying the mappings to regions of the first image to obtain values for the spatially corresponding regions of the second image, wherein each value is indicative of the likelihood that the value's corresponding region is illuminated by 1 of the m light sources;
   identifying that mapping whose associated value is most indicative of one of the m light sources; and
   identifying the one light source as an illuminant of the scene.

14. The method of claim 13, wherein the act of obtaining first and second images comprises capturing the first and second images with an imaging device.

15. The method of claim 14, wherein the act of capturing the first and second images comprises capturing the first image with a first sensor and the second image with a second different sensor of the imaging device.

16. The method of claim 13, wherein the act of obtaining first and second images cot prises retrieving first and second images from a storage device.

17. The method of claim 13, wherein the first image comprises an RGB image and the second image comprises a filtered RGB image.

18. The method of claim 13, wherein the act of obtaining mappings comprises obtaining N mappings, where N>m.

19. The method of claim 18, wherein the act of applying the mappings comprises applying N-choose-m combinations of the N mappings.

20. The method of claim 18, wherein the act of applying the mappings comprises segmenting the first image into different regions, each of which is lit by only one of the m light sources.

21. The method of claim 19, wherein the act of identifying that mapping whose associated value is most indicative of one of the m light sources, comprises identifying that mapping that has the lowest prediction error.

22. The method of claim 13, wherein the act of identifying that mapping whose associated value is most indicative of one of the m light sources comprises identifying that mapping that, based on the first image, most closely predicts the second image.

23. The method of claim 13, further comprising rendering the first image based, at least in part, on the identification of the m illuminants.

24. The method of claim 13, wherein the act of obtaining mappings comprises applying robust statistical procedures to generate the mappings.

25. An electronic device, comprising:
memory;
one or more image capture sensors operatively coupled to the memory;
a display operatively coupled to the memory; and
one or more processors operatively coupled to the memory, one or more image capture sensors and the display and configured to execute instructions stored in the memory to cause the one or more processors to—
obtain a first image of a scene that is illuminated with m light sources, wherein the first image is associated with a first spectral component,
obtain a second image of the scene, wherein the second image is associated with a second spectral component that is different from the first spectral component,
obtain mappings between regions in the first image and spatially corresponding regions in the second image,
apply the mappings to regions of the first image to obtain values for the spatially corresponding regions of the second image, wherein each value is indicative of the likelihood that the value's corresponding region is illuminated by 1 of the m light sources,
identify that mapping whose associated value is most indicative of one of the m light sources, and
identify the one light source as an illuminant of the scene.

* * * * *

UNITED STATES PATENT AND TRADEMARK OFFICE
CERTIFICATE OF CORRECTION

| | | |
|---|---|---|
| PATENT NO. | : 8,611,660 B2 | Page 1 of 1 |
| APPLICATION NO. | : 13/764833 | |
| DATED | : December 17, 2013 | |
| INVENTOR(S) | : Graham D. Finlayson et al. | |

It is certified that error appears in the above-identified patent and that said Letters Patent is hereby corrected as shown below:

In the Claims:

Col. 16, Claim 12, line 11: replace "ne" with --one--.

Col. 16, Claim 16, line 40: replace "cot prises" with --comprises--.

Signed and Sealed this
Fourth Day of March, 2014

Michelle K. Lee
*Deputy Director of the United States Patent and Trademark Office*